(12) United States Patent
Feli

(10) Patent No.: US 6,459,907 B1
(45) Date of Patent: Oct. 1, 2002

(54) SYSTEMS AND METHODS FOR CHANNEL SELECTION FOR FACSIMILE COMMUNICATION OVER A WIRELESS COMMUNICATION NETWORK

(75) Inventor: Evin Feli, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/361,940

(22) Filed: Jul. 27, 1999

(51) Int. Cl.[7] .................... H04Q 7/20; H04B 1/38; H04M 11/00
(52) U.S. Cl. .................. 455/557; 455/511; 455/553; 379/100.01; 379/100.13; 379/100.17; 379/93.09; 379/93.15
(58) Field of Search .................... 455/557, 556, 455/553, 552, 511, 426, 422, 450; 379/88.13, 100.01, 93.01, 93.05, 93.06, 93.08, 93.09, 93.15, 100.17, 100.03, 100.05, 100.12, 100.13; 370/331, 385, 352, 355, 389, 410, 474, 522; 375/216, 222

(56) References Cited

U.S. PATENT DOCUMENTS

| | | | |
|---|---|---|---|
| 5,282,238 A | | 1/1994 | Berland ...................... 455/557 |
| 5,369,501 A | * | 11/1994 | Wilson et al. ...... 379/100.17 X |
| 5,537,458 A | | 7/1996 | Suomi et al. ............... 455/422 |
| 5,752,199 A | | 5/1998 | Scott .......................... 455/557 |
| 5,781,612 A | * | 7/1998 | Choi et al. .................. 455/553 |
| 5,805,301 A | | 9/1998 | Rasanen ..................... 358/425 |
| 5,822,367 A | * | 10/1998 | Koshino et al. ............ 375/222 |
| 5,930,727 A | * | 7/1999 | Henry, Jr. ................... 455/557 |
| 5,963,869 A | * | 10/1999 | Fehnel ........................ 455/511 |
| 6,064,889 A | * | 5/2000 | Fehnel ........................ 455/511 |
| 6,101,398 A | * | 8/2000 | Joong et al. ................ 455/557 |
| 6,157,846 A | * | 12/2000 | Manning et al. ........... 455/557 |

FOREIGN PATENT DOCUMENTS

| | | |
|---|---|---|
| WO | WO90 13187 A | 11/1990 |
| WO | WO95 03667 A | 2/1995 |
| WO | WO98 06226 A | 2/1998 |

* cited by examiner

Primary Examiner—Tracy Legree
(74) Attorney, Agent, or Firm—Myers Bigel Sibley & Sajovec

(57) ABSTRACT

Communication systems and methods are provided for selecting a channel for transmission of a facsimile utilizing a wireless communication network which has two different channel types available for wireless communications. In particular, systems and methods are provided which preferentially request one of the service types for a transmission of a facsimile but further provides for use of the alternate service type under conditions where a suitable channel is not available for the preferred facsimile support channel. More particularly, in one embodiment, when digital transmission services are not available, but analog services are available, facsimile transmission is provided over the analog channel rather than denying access to the wireless communication network for transmission of the facsimile.

15 Claims, 5 Drawing Sheets

SYSTEMS AND METHODS FOR CHANNEL SELECTION FOR FACSIMILE COMMUNICATION OVER A WIRELESS COMMUNICATION NETWORK

FIELD OF THE INVENTION

The present invention relates to wireless communication systems and methods, in particular, to facsimile communications systems and methods.

BACKGROUND OF THE INVENTION

Facsimile systems are widely used to transmit images, typically of documents, from one location to another. Conventionally, a document is scanned by a "fax machine" to convert it into facsimile data which is then transmitted over a communications channel, typically a voice channel on the Public Switched Telephone Network (PSTN). The document is then reconstructed into hard copy from the transmitted facsimile data by a similar facsimile machine located at the other end of the communications channel.

Standard communications protocols have been developed for transmission of facsimile data. Older analog protocols, such as CCITT Group 1 and Group 2, are now generally obsolete. The digital CCITT Group 3 protocol, widely used by conventional office and home facsimile machines, uses digital modems transmitting digital facsimile data at speeds up to 9600 baud over conventional PSTN telephone lines. The Group 3 protocol includes handshaking and signal quality evaluation features which enable facsimile machines to step down the communication baud rate if the communications channel exhibits poor quality. A CCITT Group 4 protocol has also been established to provide less error-prone communication between facsimile machines over public data networks other than the PSTN.

Because of the increased mobility it offers, cellular radiotelephone technology is increasingly supplanting the PSTN for many communications applications. Mobile cellular radiotelephones are now a common sight in businesses, home, and automotive environments. Personal computers have also been adapted for use with cellular radiotelephone communications systems, exchanging the wireline modem for a similar device acting over a cellular radiotelephone voice or data channel.

Examples of suitable cellular networks which could beneficially be used as an alternative to a PSTN include analog cellular radiotelephone systems, such as designated AMPS, ETACS, NMT-450, and NMT-900, which have been deployed successfully throughout the world. More recently, digital cellular radiotelephone systems such as that designated as IS-54B (and its successor IS-136) in North America and the pan-European GSM system have also been introduced. These systems, and others, are described, for example, in the book titled *Cellular Radio Systems* by Balston, et al., published by Artech House, Norwood, Mass., 1993. In addition, satellite based radio communication systems are also being utilized to provide wireless communications in various regions such as the Asian Cellular Satellite System (ACeS) generated by Lockheed Martin Corporation. Furthermore, dual-mode mobile terminals are known which allow a single terminal to access to different networks. For example, an analog/digital dual-mode terminal or a terrestrial/satellite dual-mode terminal may be desirable in various geographic areas to maximize the communications capabilities available to a user.

One obstacle to implementation of facsimile communications over cellular radiotelephone communications systems is the generally lower bandwidth, lower signal quality, and higher communications costs which may be associated with cellular radiotelephone channels in comparison to conventional PSTN channels. One approach to providing more reliable radio transmission of facsimile data using packet data protocols with checking and retransmission features is described in U.S. Pat. No. 5,282,238 to Berland. An approach to sending faxes over analog cellular networks is described in U.S. Pat. No. 5,752,199 to Scott. Each of these approaches proposes ways to improve performance of facsimile transmission when a wireless channel is provided for this purpose.

The IS-136 communication standard, which provides for both analog and digital communication support, specifically supports Group 3 type facsimile transmissions. Under the IS-136 standard, a mobile terminal requesting communication access typically provides the communication network a service code. The service code may, for example, request analog speech, digital speech, analog or digital speech with a specified preference, asynchronous data or Group 3 type facsimile services from the IS-136 network. On receipt of a Group 3 facsimile service code, under the IS-136 standard, the communication system determines if a digital traffic channel is available. If a digital traffic channel is available, the request may be serviced, otherwise the service request is rejected. Accordingly, under the IS-136 standard, facsimile transmission requests will not be supported when no digital traffic channels are available.

SUMMARY OF THE INVENTION

In order to provide for the foregoing and other objectives, a method is provided for selecting a channel for transmission of a facsimile utilizing a wireless communication network which has two different channel types available for wireless communications. For example, a network such as an IS-136 protocol network supports both analog and digital wireless communication services. The present invention provides systems and methods which preferentially request one of the service types for a transmission of a facsimile but further provides for use of the alternate service type under conditions where a suitable channel is not available for the preferred facsimile support channel. More particularly, in one embodiment, when digital transmission services are not available, but analog services are available, facsimile transmission is provided over the analog channel rather than denying access to the wireless communication network for transmission of the facsimile.

In one embodiment of the present invention, methods are provided for selecting a channel for transmission of a facsimile. A request is transmitted by a mobile terminal to a wireless communication network having a first and a second channel type requesting a channel for use in transmitting a facsimile. A designation of a channel of the first channel type is received from the wireless communication network if a channel of the first channel type is available and of the second channel type if a channel of the first channel type is not available. The facsimile may then be transmitted on the designated channel. In a particular embodiment, the first channel type is a digital traffic channel and the second channel type is an analog voice channel and the facsimile is a Group 3 type facsimile. The wireless communication network may be a dual analog digital system such as an IS-136 protocol network.

In a further embodiment of the present invention, a facsimile having a first protocol is received for transmission. The facsimile is provided to the designated channel without protocol conversion if the designated channel is the analog voice channel. The protocol of the facsimile is converted to a second protocol and the converted protocol facsimile is provided to the designated channel if the designated channel is the digital traffic channel. The first protocol may be a T.30 protocol and the second protocol may be an IS-135 protocol.

In a system aspect of the present invention, a mobile terminal is provided including a portable housing and a wireless communication circuit in the housing and coupled to a wireless communication network having a first and second channel type. A line interface circuit is also provided in the mobile terminal including a facsimile input port and a protocol conversion circuit having an output connected to the wireless communication circuit. A connection line is provided connected to the wireless communication circuit. In addition, a switch is provided connecting one of an input of the protocol conversion circuit or the connection line to the facsimile input port responsive to a request from the wireless communication circuit. The wireless communication circuit in a particular embodiment includes means for requesting connection of the input of the protocol conversion circuit to the facsimile input port responsive to an indication from the wireless communication network that a channel of the first channel type is available for transmission of the facsimile and for requesting connection of the connection line to the facsimile input port responsive to an indication from the wireless communication network that a channel of the first channel type is not available for transmission of the facsimile. A means for transmitting the facsimile on the wireless communication network over a channel of the first channel type and a channel of the second channel type is also provided.

In another embodiment of the present invention, a channel selection system for transmission of a facsimile is provided including means for receiving the facsimile for transmission and means for requesting from a wireless communication network having a first and a second channel type a channel for use in transmitting the facsimile. The channel selection system further includes means for receiving a designation of a channel of the first channel type from the wireless communication network if a channel of the first channel type is available and of the second channel type if a channel of the first channel type is not available and means for transmitting the facsimile on the designated channel.

In a further aspect of the present invention, a channel selection system is provided for receipt of a facsimile including means for receiving a request from a mobile terminal for a channel to use in transmitting the facsimile. The channel selection system also includes means for transmitting a designation of a channel of a first channel type if a channel of the first channel type is available and of a second channel type if a channel of the first channel type is not available. Corresponding methods are also provided.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by those of skill in the art, the present invention may be embodied as methods or devices. Accordingly, the present invention may take the form of a hardware embodiment, a software embodiment or an embodiment combining software and hardware aspects.

Figure 1:
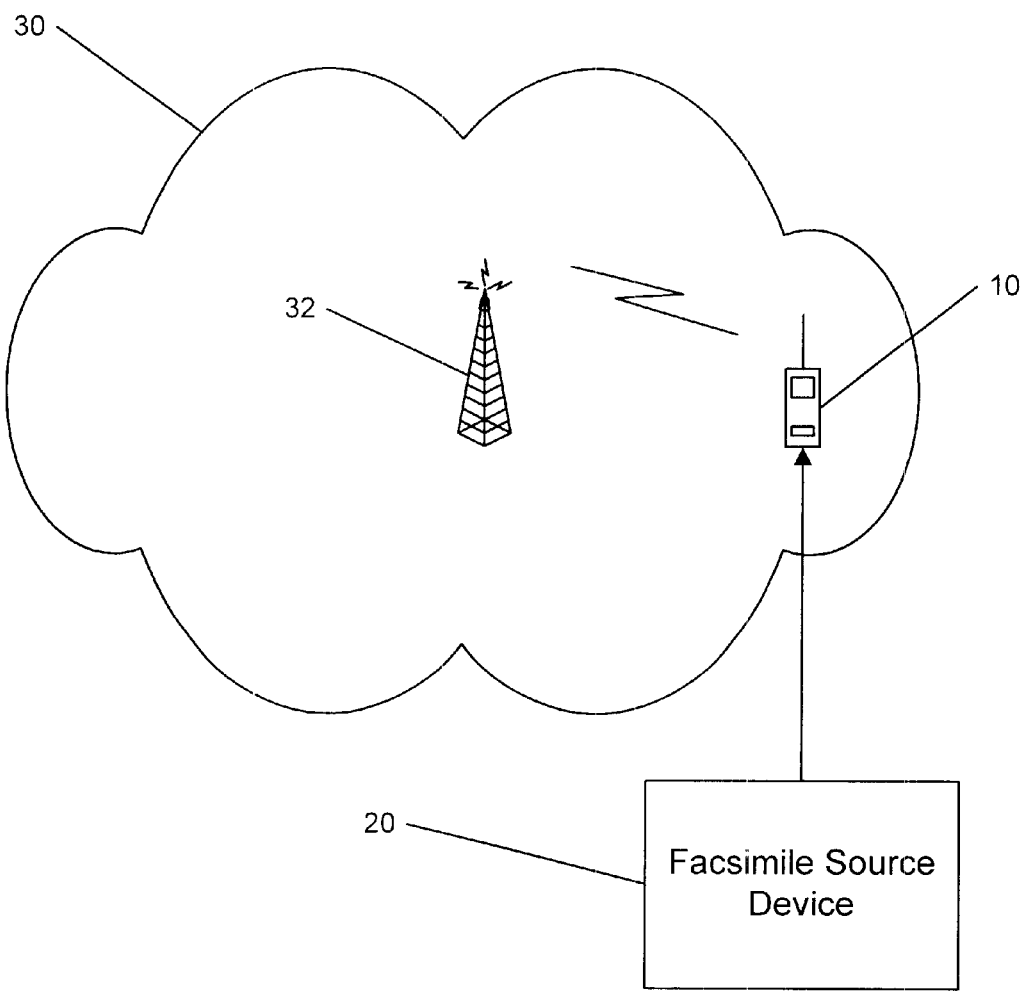
FIG. 1 schematically illustrates a system for channel selection for communication of a facsimile according to an embodiment of the present invention.

Referring now to FIG. 1, an embodiment of channel selection systems and methods for transmission of a facsimile according to the present invention will now be described. As shown in FIG. 1, a mobile terminal 10 is connected to a facsimile source device 20. The facsimile source device 20 may be a variety of devices which support generation of facsimile format images for transmission between remote locations. Such devices include conventional facsimile machines which scan documents and convert the document image into facsimile data for transmission over a communications channel as well as personal computers or other processor-based, software-codable devices which may employ hardware and software to emulate the functions of a facsimile machine. Furthermore, the facsimile source device 20 may be integral to the mobile terminal 10 combining the facsimile machine and wireless communication functions in a single device.

Preferably, the facsimile source device 20 is connected to the mobile terminal 10 by a wired rather than wireless connection. However, alternative types of connections between the mobile terminal 10 and the facsimile source device 20, such as infrared serial ports or other known wireless methods for connecting devices in close proximity, may be used. Furthermore, the facsimile source device 20 may represent a network of interconnected devices, such as a computer network, where the facsimile image may be routed from one device on the network to another device which, in turn, provides the facsimile image to the mobile terminal 10 for transmission over a wireless transmission network.

The mobile terminal 10 according to the present invention is preferably a full function radiotelephone device supporting voice and/or data communications over wireless communication networks in addition to providing support for facsimile transmissions from the facsimile source device 20. Alternatively, however, the mobile terminal 10 may be a more limited function device specifically configured to support facsimile transmissions over a wireless communication network. In this case, various components and aspects of a full function radiotelephone need not be included in the mobile terminal 10 while still providing for systems and support of operations according to the present invention.

In addition to being connected to the facsimile source device 20, as shown in FIG. 1, the mobile terminal 10 of the present invention is further configured to communicate over the wireless communication network 30. The wireless communication network 30 may be a terrestrial or satellite based cellular radiotelephone network or other type of wireless communication network supporting two or more different channel types for wireless communications. An illustrative base station antenna 32 of a cellular radiotelephone communication network is shown in FIG. 1. However, it is to be understood that such networks typically include a plurality of base station antennas 32 and are connected through base station controllers, mobile switching centers and other devices conventionally known in cellular radiotelephone networks. The mobile terminal 10 is preferably configured to obtain access to a channel for wireless communications by making a request to the wireless communication network 30 by wireless transmission to a base station antenna 32 in the vicinity of the mobile terminal 10.

Figure 2:
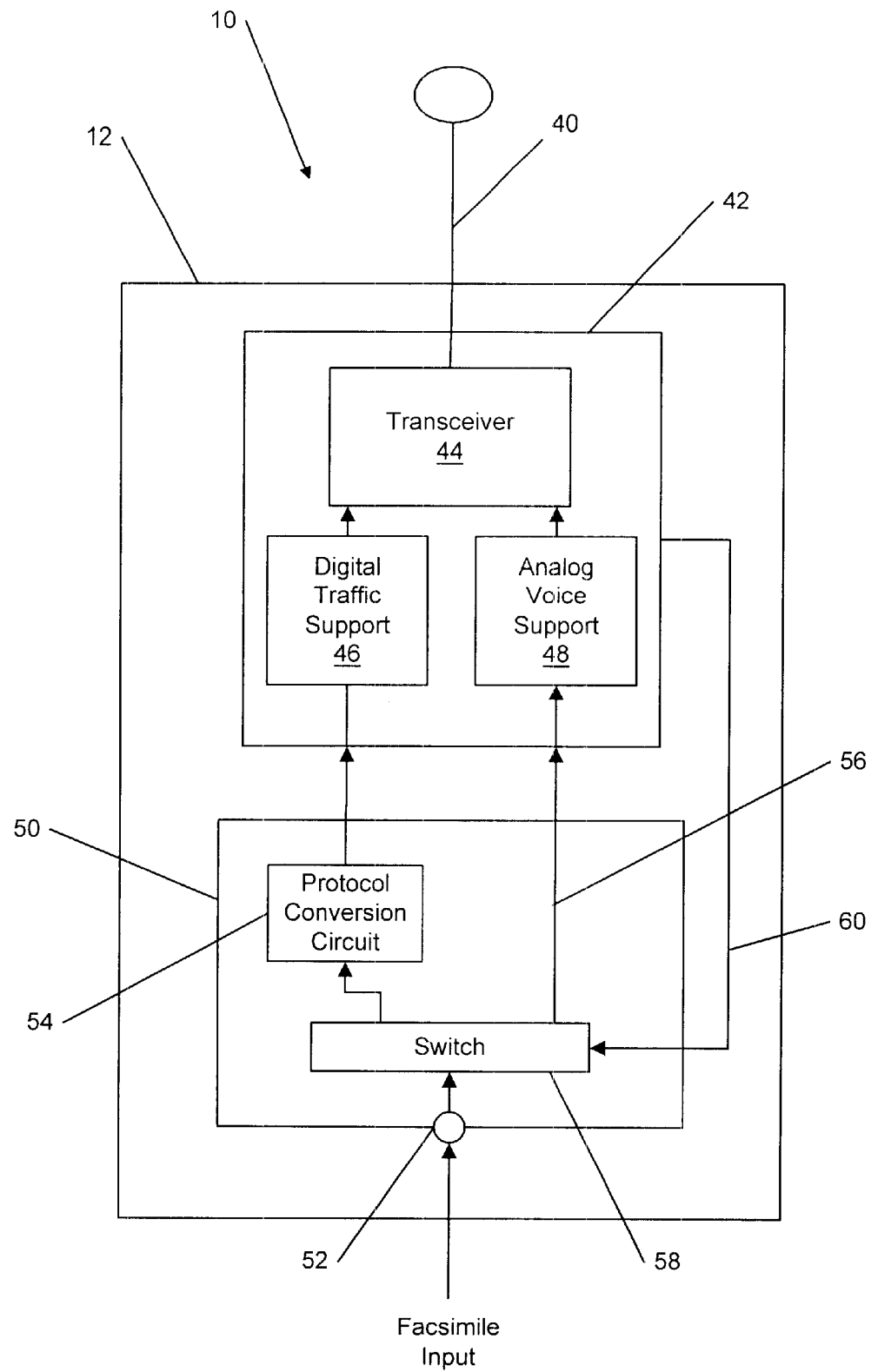
FIG. 2 is a block diagram of a mobile terminal according to an embodiment of the present invention.

Referring now to FIG. 2, an embodiment of a mobile terminal 10 according to an embodiment of the present invention will now be further described. As shown in FIG. 2, the mobile terminal 10 includes an antenna 40 for use in transmitting and receiving wireless communication signals such as radio frequency (RF) signals. The antenna 40 extends from a portable housing 12 which contains the electronic components of the mobile terminal 10. The mobile terminal 10 further includes a wireless communication circuit 42 or other means for communicating with the wireless communication network 30 positioned within the housing 12. The wireless communication circuit 42 includes a transceiver 44 coupled to the antenna 40 or other means for transmitting and receiving wireless communication signals such as RF signals.

In the embodiment of FIG. 2, the mobile terminal 10 is a dual-mode mobile terminal supporting both analog and digital format radiotelephone communications protocols. Accordingly, the wireless communication circuit 42 includes digital traffic support circuit 46 and analog voice support circuit 48. The various signal processing and control circuitry necessary to support each type of communication are conventionally known and will not be further described herein except as related to particular aspects of facsimile transmission in accordance with the teachings of the present invention. It is to be understood that the extent of functions provided by digital traffic support circuit 46 and analog voice support circuit 48 depend upon whether the mobile terminal 10 is provided as a device supporting full communication functions over both channel types or is a more limited device specifically directed to supporting facsimile transmissions from a facsimile source device 20.

The mobile terminal 10 further includes a line interface circuit 50. As shown in the embodiment of FIG. 2, the line interface circuit 50 is positioned within the portable housing 12 of the mobile terminal 10. However, it is to be understood that the line interface circuit 50 may be provided as a separate device which may be coupled to the wireless communication circuit 42 of the mobile terminal 10, for example, through an interface port provided on the mobile terminal 10.

The line interface circuit 50 as illustrated in FIG. 2 includes a facsimile input port 52 configured to receive the facsimile image input from the facsimile source device 20. The facsimile input port 52 may, for example, be either a wire connector or infrared port based RJ-11 or other serial or parallel interface type port.

The mobile terminal 10 further includes a protocol conversion circuit 54 or other means for converting the protocol of a received facsimile image from a first transmission protocol to a second transmission protocol. For example, in one embodiment of the present invention suitable for use where the wireless communication network 30 is an IS-136 protocol network, the protocol conversion circuit 54 is configured to convert a Group 3 type facsimile in T.30 protocol to an IS-135 protocol for transmission of the facsimile image over a digital channel of the IS-136 network. While the protocol conversion circuit 54 is shown as separate from the wireless communication circuit 42, it is to be understood that the protocol conversion circuit 54 may be implemented in software code which code may be executed by a processor which also executes code implementing digital traffic support circuit 46 and analog voice support circuit 48.

The line interface circuit 50 further includes a connection line 56 which is connected to the wireless communication circuit 42 and to the switch 58 of the line interface circuit 50. The connection line 56 may simply be a simple wired connection between the switch circuit 58 and the wireless communication circuit 42 or it may include various known types of buffer circuits suitable for supporting any signal voltage or circuit load requirements of the wireless communication circuit 42 while still providing a direct connection without any protocol conversion.

The switch 58 or other means for connecting either the input of the protocol conversion circuit 54 or the connection line 56 to the facsimile input port 52 is also configured to receive a select input 60 from the wireless communication circuit 42. Accordingly, the select input 60 from the wireless communication circuit 42 allows the routing of the facsimile input to be selected based upon a designation from the wireless communication network 30 of the type of service (or channel type) which is available to support a request to transmit a facsimile.

While not specifically shown in the wireless communication circuit 42 of FIG. 2, it is to be understood that the wireless communication circuit 42 further includes means for detecting that a facsimile image has been submitted to the mobile terminal 10 for transmission over the wireless communication network 30. As will be described further herein, this allows the mobile terminal 10 to initiate a request to the wireless communication network 30 to determine what channel type is available for the transmission. The switch 58 routing is selected by the wireless communication circuit 42 responsive to a designation from the wireless communication network 30 of the channel type available for the requested transmission.

On receipt of the channel type information from the wireless communication circuit 30, wireless communication circuit 42, through select line 60, provides a means for requesting connection of the input of the protocol conversion circuit 54 to the facsimile input port 52 on receipt of an indication from the wireless communication network 30 that a channel of a first channel type is available for transmission of the facsimile and for requesting connection of the connection line 56 to the facsimile input port 52 responsive to receipt of an indication from the wireless communication network 30 that a channel of the first channel type is not available for transmission of the facsimile but a channel of the second type is available. The wireless communication circuit 42 is, accordingly, configured to provide means for transmitting the facsimile on a wireless communication network over a channel of either the first or the second channel type, such as a digital traffic channel or an analog voice channel.

Figure 3:
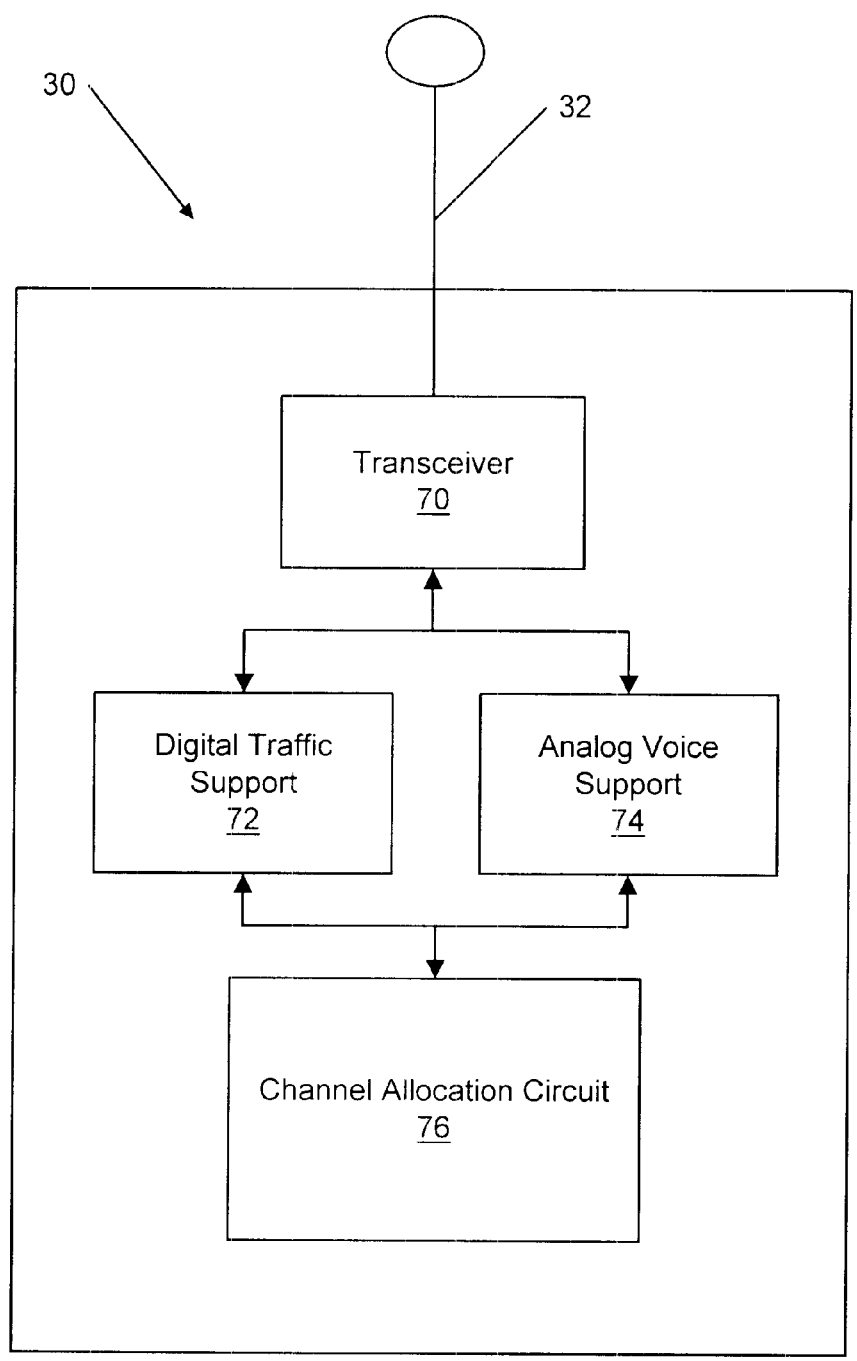
FIG. 3 is a block diagram of a channel selection system for receipt of a facsimile according to an embodiment of the present invention.

Referring now to FIG. 3, a channel selection system for receipt of a facsimile in a wireless communication network 30 according to an embodiment of the present invention will be further described. As with the embodiment of the mobile terminal 10 in FIG. 2, the wireless communication network 30 includes a transceiver 70 or other means for receiving and transmitting signals over a wireless communication channel and both digital traffic support circuit 72 and analog voice support circuit 74. A single base station antenna 32 is also illustrated as a component of the wireless communication network 30 in FIG. 3. However, it is to be understood that the wireless communication network 30 typically includes a plurality of base station antennas 32 and other components, such as base station controllers and mobile switching centers. Accordingly, while the wireless communications network 30 is illustrated schematically as a single device in FIG. 3, it is to be understood that, in practice, it will typically be comprised of a variety of devices at different locations connected by wireless and/or wired connection lines.

The antenna 32 and transceiver 70 in combination with either the digital traffic support circuit 72 or the analog voice support circuit 74 provide means for receiving at the wireless communication network 30 a request from a mobile terminal 10 for allocation of a channel to use in transmitting a facsimile. The channel allocation circuit 76 or other means for transmitting a designation of a channel responsive to the request from the mobile terminal is also included in the wireless communication network 30 as illustrated in FIG. 3.

The channel allocation circuit 76 provides means for determining the availability of a first or second channel type such as a digital traffic or an analog voice channel at the time of receipt of request to transmit a facsimile. It further provides a means for designating a channel of the first channel type, such as the digital traffic channel, if such a channel is available and, alternatively, of designating a channel of the second channel type, such as an analog voice channel, if a channel of the first channel type is not available but a channel of the second channel type is available. In one embodiment, the facsimile transmission is of a Group 3 type facsimile and the wireless communication network 30 is an IS-136 protocol wireless communication network supporting both digital and analog communication channels.

As will be appreciated by those of skill in this art, the above-described aspects of the present invention in FIG. 2 and FIG. 3 may be provided by hardware, software, or a combination of the above. While various components of mobile terminal 10 have been illustrated in FIG. 2, in part, as discrete elements, they may, in practice, be implemented by a microcontroller including input and output ports and running software code, by custom or hybrid chips, by discrete components or by a combination of the above. For example, digital traffic support circuit 46 and analog voice support circuit 48 may be implemented in part as code executing on a processor. Similarly, while various components of the communication network based channel selection system 30 have been illustrated in FIG. 3, in part, as discrete elements, they may, in practice, be implemented by a microcontroller including input and output ports and running software code, by custom or hybrid chips, by discrete components or by a combination of the above. For example, digital traffic support circuit 72, analog voice support circuit 74 and channel allocation circuit 76 could be implemented in part as code executing on a processor.

Operations of the present invention will now be described with respect to the flowchart illustrations of FIG. 4 and FIG. 5. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 4:
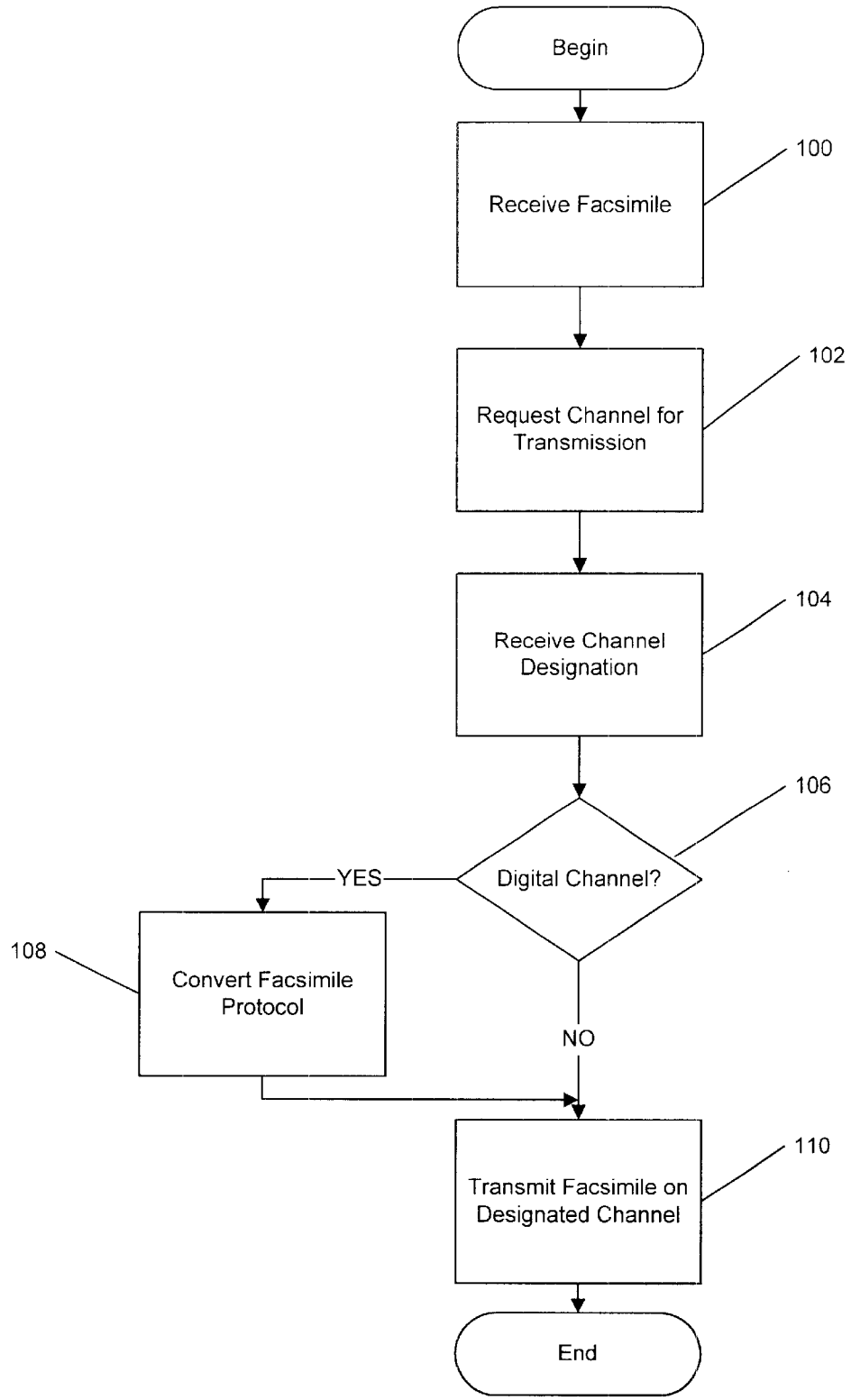
FIG. 4 is a flowchart illustrating operations for an embodiment of the present invention with reference to the transmission of a facsimile by a mobile terminal.

Referring now to FIG. 4, operations according to an embodiment of the present invention from the perspective of a mobile terminal 10 will now be further described. As shown in FIG. 4, operations begin at block 100 with the mobile terminal 10 receiving a facsimile image for transmission from the facsimile source device 20. The mobile terminal 10 then requests a wireless communication channel from the wireless communication network 30 for use in transmitting the facsimile (block 102). A channel designation is received by the mobile terminal 10 from the wireless communication network 30 responsive to the request for allocation of a channel (block 104). If the designated channel is determined by the mobile terminal 10 to be a channel of the first type (such as a digital traffic channel in the illustrated embodiment), at block 106, the transmission protocol of the facsimile image is converted by the mobile terminal 10 (block 108). Otherwise, the protocol of the facsimile image is not converted. The facsimile is then transmitted over the designated channel by the mobile terminal 10 (block 110).

The request for a channel preferably states a preferred type of channel for use in the facsimile transmission. More particularly, where the wireless communication network 30 is a dual digital and analog protocol network such as an IS-136 protocol network, a digital traffic channel is preferred. Accordingly, a designation of a channel of the first or digital channel type is received from the wireless communication network 30 at block 104 if a channel of this type is available and a channel of the second or analog type is received if a digital type channel is not available.

The protocol for transmission of the facsimile may be received at block 100 as a T.30 or other protocol associated with facsimile images such as Group 3 type facsimile images. Furthermore, the facsimile protocol conversion operations at block 108 may then convert the T.30 protocol to an IS-135 protocol suitable for use in transmissions over digital traffic channels such as those supported by IS-136 protocol wireless communication networks.

Figure 5:
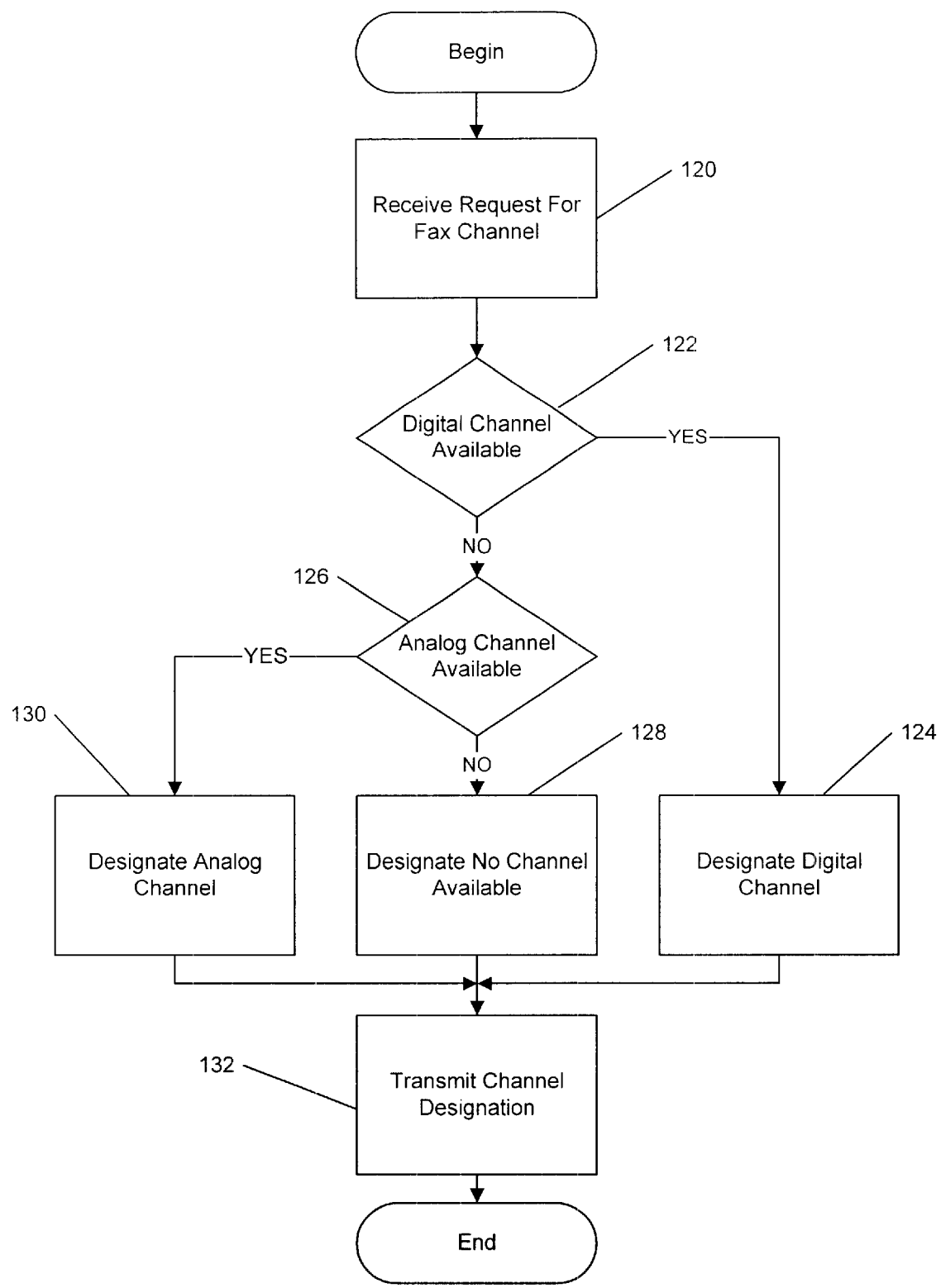
FIG. 5 is a flowchart illustrating operations for an embodiment of the present invention with reference to the receipt of a facsimile over a wireless communication channel.

Referring now to FIG. 5, operations according to an embodiment of the present invention will now be described from the perspective of the wireless communication network 30. The wireless communication network 30 receives a request for transmission of a facsimile from the mobile terminal 10 (block 120). The wireless communication network 30 then determines if a channel of the first or preferred type, such as a digital traffic channel for an IS-136 protocol network as shown in the embodiment of FIG. 5, is available (block 122). If a digital traffic type channel is available, the available digital traffic type channel is designated for transmission of the facsimile by the wireless communication network 30 (block 124). If the desired (digital traffic in FIG. 5) channel type is not available, the wireless communication network 30 determines if the second or less preferred channel type, the analog voice type channel in the embodiment of FIG. 5, is available for facsimile transmission (block 126). If an analog voice type channel is available, the available analog type channel is designated for the facsimile transmission by the wireless communication network 30 (block 130). If no channel of either type is available for transmission, the wireless communication network 30 designates no channel as available (block 128). The channel designation is then transmitted to the mobile terminal 10 by the wireless communication network 30 (block 132).

The facsimile may then subsequently be received over the designated channel by the wireless communication network 30 and routed to a destination facsimile receiving device such as a facsimile machine. The destination device may be specified by the transmitting mobile terminal 10, for example, by an associated telephone number.

While described above with reference to embodiments in which the wireless communication system 30 selects an analog channel when no digital channel is available, these selection operations may, alternatively, be supported by the mobile terminal 10. For example, the mobile terminal 10 could first request a channel of the first type (digital). If no such channel is available, the mobile terminal could then make a second request, this time for a channel of the second type (analog). In the particular case of the IS-136 protocol, the first request would be a service code for a Group 3 fax and the second would be for an analog voice channel. The analog transmission would then proceed without specifically notifying the wireless communication network 30 that a facsimile transmission was occurring.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for transmission of a facsimile from a mobile terminal comprising the following carried out at the mobile terminal:
   receiving a facsimile having a first protocol for transmission;
   requesting from a wireless communication network having a first and a second channel type a channel for use in transmitting a facsimile;
   receiving a designation of a channel of the first channel type from the wireless communication network if a channel of the first channel type is available and of the second channel type if a channel of the first channel type is not available;
   providing the facsimile to the designated channel without protocol conversion if the designated channel is the analog voice channel; and
   converting the protocol of the facsimile to a second protocol and providing the converted protocol facsimile to the designated channel if the designated channel is the digital traffic channel.

2. A method according to claim 1 further comprising transmitting the facsimile on the designated channel.

3. A method according to claim 2 wherein the first channel type is a digital traffic channel and the second channel type is an analog voice channel.

4. A method according to claim 3 wherein the facsimile is a Group 3 type facsimile.

5. A method according to claim 4 wherein the wireless communication network is an IS-136 protocol network.

6. A method according to claim 5 wherein the first protocol is a T.30 protocol and the second protocol is an IS-135 protocol.

7. A mobile terminal comprising:
   a portable housing;
   a wireless communication circuit in the housing and coupled to a wireless communication network having a first and second channel type; and
   a line interface circuit comprising:
      a facsimile input port;
      a protocol conversion circuit having an output connected to the wireless communication circuit;
      a connection line connected to the wireless communication circuit; and
      a switch connecting one of an input of the protocol conversion circuit or the connection line to the facsimile input port responsive to a request from the wireless communication circuit.

8. A mobile terminal according to claim 7 wherein the wireless communication circuit includes:
   means for requesting connection of the input of the protocol conversion circuit to the facsimile input port responsive to an indication from the wireless communication network that a channel of the first channel type is available for transmission of the facsimile and for requesting connection of the connection line to the facsimile input port responsive to an indication from the wireless communication network that a channel of the first channel type is not available for transmission of the facsimile; and
   means for transmitting the facsimile on the wireless communication network over a channel of the first channel type and a channel of the second channel type.

9. A mobile terminal according to claim 8 wherein the first channel type is a digital traffic channel and the second channel type is an analog voice channel and wherein the wireless communication network is an IS-136 protocol network.

10. A mobile terminal according to claim 9 wherein the protocol conversion circuit is configured to convert a T.30 protocol to an IS-135 protocol.

11. A mobile terminal comprising:
   means for receiving a facsimile for transmission, the received facsimile having an associated first protocol for transmission;
   means for requesting from a wireless communication network having a first and a second channel type a channel for use in transmitting the facsimile;
   means for receiving a designation of a channel of the first channel type from the wireless communication network if a channel of the first channel type is available and of the second channel type if a channel of the first channel type is not available;
   means for providing the facsimile to the designated channel without protocol conversion if the designated channel is the analog voice channel;

means for converting the facsimile to a second protocol and providing the converted protocol facsimile to the designated channel if the designated channel is the digital traffic channel; and means for transmitting the facsimile on the designated channel.

12. A system according to claim 11 wherein the first channel type is a digital traffic channel and the second channel type is an analog voice channel.

13. A system according to claim 12 wherein the facsimile is a Group 3 type facsimile.

14. A system according to claim 13 wherein the wireless communication network is an IS-136 protocol network.

15. A system according to claim 14 wherein the first protocol is a T.30 protocol and the second protocol is an IS-135 protocol.

* * * * *